June 18, 1929.  R. H. ROSENBERG  1,717,522
VENTILATED BRAKE ROTOR
Filed Aug. 25, 1927
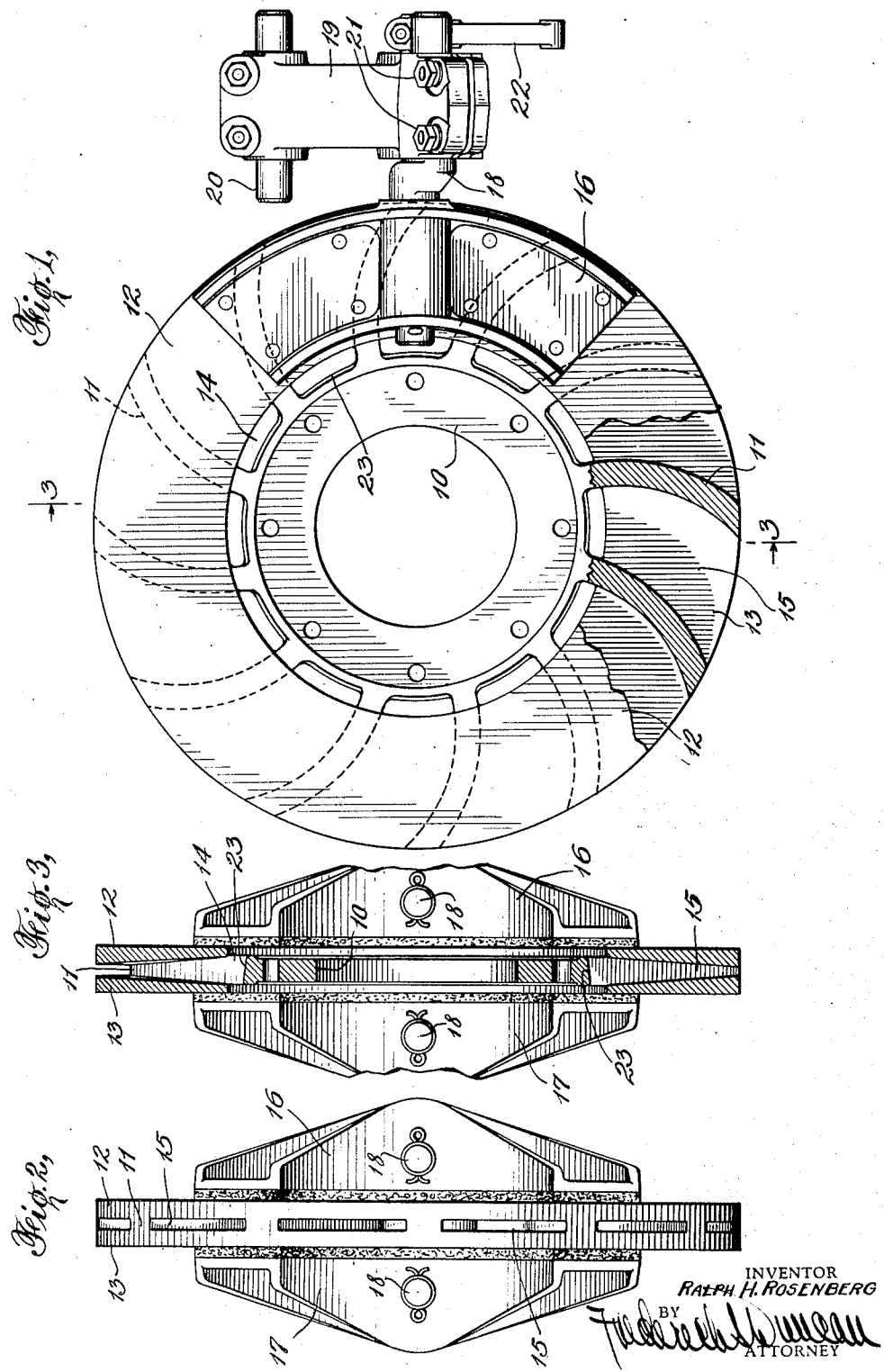
INVENTOR
RALPH H. ROSENBERG
BY
ATTORNEY Patented June 18, 1929.

1,717,522

UNITED STATES PATENT OFFICE.

RALPH H. ROSENBERG, OF SYRACUSE, NEW YORK, ASSIGNOR TO AMERICAN CABLE COMPANY, INC., A CORPORATION OF DELAWARE.

VENTILATED BRAKE ROTOR.

Application filed August 25, 1927. Serial No. 215,373.

My invention relates to rotors adapted specifically for brakes, friction clutches and the like, and has for an object to provide means for rapidly dissipating heat generated by frictional engagement of brake shoes or clutch members with the rotor.

Another object of my invention is to provide a rotor having a very large radiating surface in proportion to its diameter. To this end my invention provides a rotor of skeleton construction comprising relatively thin spaced members, the outer faces of which provide friction or braking surfaces. The space between the members thus permits direct radiation of heat generated under the brake shoes.

Another object of my invention is to provide a rotor which will generate currents of air to assist in carrying off heat developed in the rotor. In a rotor of skeleton construction such as described above, ribs are provided between the said members for the double purpose of reinforcing the members and providing passages through which air currents will be projected by centrifugal force. Thus my improved rotor consists virtually of a centrifugal fan which automatically produces air currents for cooling the braking surfaces.

In brakes having a disk-shaped rotor with a brake shoe engaging the face of the disk there is an unequal generation of heat due to the higher velocity at the periphery of the rotor than that in regions lying nearer the center. It is an object of my invention to provide a construction in which the velocity of the air will be increased as it approaches the periphery of the disk so as to carry off the higher heat in the region of the periphery more rapidly. Thus I maintain a uniform cooling of the disk which prevents troublesome warping of the parts. Furthermore, the skeleton construction not only provides a lighter rotor but also serves to materially strengthen the rotor against the forces to which it may be subjected.

With these and other objects in view which will appear hereinafter, I shall now describe an embodiment of my invention in connection with the accompanying drawings, with the understanding that these drawings are to be taken in the purely illustrative sense and do not constitute a limitation of my invention. Obviously many changes in details of construction and arrangements of parts can be made without departing from the spirit and scope of my invention as clearly defined in the appended claims.

In the drawings

Fig. 1 is a face elevation of my improved rotor and brake mechanism associated therewith;

Fig. 2 is an edge view of the same; and

Fig. 3 is a view in section taken on the line 3—3 of Fig. 1.

In the particular embodiment of my invention illustrated in the drawings, the rotor consists of a web or hub portion 10 which may be secured to a wheel, shaft or other rotating member. Spokes or ribs 11 project from the periphery of the web and support spaced annular side plates 12 and 13. Preferably the web, ribs and side plates are integrally formed in a single casting, so that there will be no joints to interrupt or retard the conduction of heat through the structure. The annular plates 12 and 13 do not extend inward as far as the outer periphery of the web portion 10 and hence openings 14 are formed in the rotor which extend through the rotor from one side to the other between the side plates and the web. Passages 15 are also formed between the ribs and the plates which communicate with the openings 14. The ribs 11 instead of extending radially from the web 10 are curved rearward or in a direction opposed to the direction of rotation of the rotor, so that as the rotor revolves, air entering the slots 14 will be thrown centrifugally out of the passages 15 and the curve of the ribs 11 will permit a practically straight-line motion of the air currents through the passages 15.

The outer surfaces of the plates 12 and 13 are engaged by brake shoes 16 and 17 respectively. The latter may be of any desired form but for purposes of illustration are shown as of the type described in my co-pending application, Serial No. 215,374, filed Aug. 25, 1927. The shoes 16 and 17 are pivotally supported on eccentric pins 18 journalled in an arm 19. The latter is free to swing on pivot 20 journalled in a suitable support (not shown). By turning one of the pins 18 in the arm 19 the brake shoes may be adjusted relatively to each other and may be clamped in the adjusted position by means of bolts 21. The other of the pins 18 carries an operating arm 22 by which it may be turned in its bearing in the arm 19 to move the brake shoes into gripping position against the plates 12 and 13, and owing to the pivotal support of the arm 19 a uniform pressure will be exerted on the two side plates.

By referring to Fig. 3 it will be observed that the plates 12 and 13 are tapered from a relatively thick cross section at their outer peripheries to a relatively thin cross section at the inner peripheries thereof. The taper is such as to constrict the passages 15 providing a reduced cross-sectional area at the outer ends of the passages with respect to the inner ends. The result of this construction is to produce a higher velocity of air at the outer periphery of the rotor than at the inner periphery so that the greater heat generated at the outer periphery will be more rapidly dissipated by the increased velocity of air at the outer periphery.

My improved rotor is particularly adapted for use on transmission shafts of motor vehicles where it is subjected to a blast of air produced by the motion of the vehicle, this blast being projected against the forward face of the rotor. In order to prevent the air from flowing freely through the slots 14 without entering the passages 15 I provide the outer edge of the web portion 10 with a tapered face 23 of such angle that the air in striking the tapered face 23 will be deflected and diverted into the passages 15.

In operation when the brake shoes are moved into frictional engagement with the side plates 12 and 13, heat is generated, which radiates both from the outer surfaces of the plates and from the inner surfaces thereof. At the same time the ribs 11 act as fan blades to produce centrifugal air currents through the passages 15, and these currents aid in carrying off the heat. The blades being reversely curved with respect to the direction of rotation of the rotor give an outward thrust to the air currents augmenting the centrifugal flow through the passages. Furthermore, when the rotor is mounted on a body moving in a direction parallel to the axle of the rotor, the air currents due to such movement strike the inclined surfaces 23 at the bottom of the slots or inlets 14 and are deflected into the passages 15, thus still further increasing the air flow through the passages. As the cross-sectional area of the passages is gradually reduced from the inlet ends 14 to the outlet ends at the periphery of the rotor, the velocity of the air currents is proportionately increased toward the periphery to compensate for the corresponding gradient of heat generated by the braking surfaces.

While I have described my invention as applied to a brake I do not limit myself to this application for it will be obvious that my improved construction is equally applicable for use in a friction clutch.

Having thus described my invention, what I claim as new and desire to secure by Letters Patent is:

1. The combination with a brake shoe of a rotor having an annular portion providing on one side thereof a braking surface disposed at an angle to the axis of the rotor, means on the rotor for generating a current of air, and means for directing said air current against the opposite side of said annular portion and grading the velocity of the air current relatively to the gradient of heat developed by frictional engagement of the shoe with said annular portion.

2. The combination with a brake shoe of a rotor having a disk portion formed with a braking surface on one side thereof, means on the rotor for generating a current of air, and means for directing said current against the opposite side of the disk portion and grading the velocity of the current in proportion to the gradient of heat developed by frictional engagement of the shoe with said disk portion.

3. The combination with a brake shoe of a rotor having a disk portion formed with a braking surface on one side thereof, blades carried by the rotor for generating centrifugal currents of air, and means for directing said currents along the opposite side of said disk portion and grading the velocity of said currents in direct ratio to the gradient of heat developed by frictional engagement of the shoe with said disk portion.

4. A rotor comprising a body portion, ribs extending therefrom, and annular plates carried by the ribs, the outer faces of the plates being adapted to serve as braking surfaces, the plates being spaced apart to provide passages therebeteween for the centrifugal discharge of air through the rotor, and the inner faces of the plates being inclined to gradually constrict the air passages from their inner to the outer peripheral ends.

5. A rotor comprising a body portion, ribs extending therefrom, and annular plates carried by the ribs, the outer faces of the plates being adapted to serve as braking surfaces, the plates being spaced apart to provide passages therebetween for the centrifugal discharge of air through the rotor, the cross-sectional area of each passage being gradually reduced from the inner to the outer peripheral end thereof.

6. A rotor comprising a central web, a pair of annular plates annularly spaced from the web, and ribs integrally connecting the web and the plates, the plates being mutually spaced apart and providing parallel outer braking surfaces, the ribs extending between the spaced plates to form air passages and the plates tapering in radial cross-section to a maximum thickness at the periphery thereof.

7. A rotor member for brakes comprising a central web, a pair of annular plates annularly spaced from the web, and ribs integrally connecting the web and the plates, the latter being mutually spaced apart and the ribs extending between the spaced plates to form air passages, the rotor being further formed with a deflecting surface at the inner end of such passages for guiding air into said passage.

8. A rotor member for brakes comprising a central web, a pair of annular plates radially spaced from the web, and ribs integrally connecting the web and the plates, the latter being mutually spaced apart and the ribs extending between the spaced plates to form air passages, and the outer edge of the web between the ribs being conically tapered to provide surfaces for deflecting air into the passages.

9. A rotor comprising a central web, a pair of angular plates annularly spaced from said web, and ribs integrally connecting said web and plates, said plates being mutually spaced apart, the ribs extending between said spaced plates to form air passages and said plates converging radially toward the periphery to restrict said air pasages.

In testimony whereof, I have signed this specification.

RALPH H. ROSENBERG.